United States Patent

[11] 3,593,046

[72] Inventors Carl Peter Sandbank;
David Lane Thomas, both of Bishop's Stortford, England

[21] Appl. No. 704,384
[22] Filed Feb. 9, 1968
[45] Patented July 13, 1971
[73] Assignee International Standard Electric Corporation New York, N.Y.
[32] Priority Feb. 14, 1967
[33] Great Britain
[31] 6924

[54] COMMUNICATION SYSTEM INCLUDING A PLURALITY OF SEMICONDUCTIVE CIRCUIT ARRANGEMENTS USING GUNN EFFECT DEVICES
9 Claims, 5 Drawing Figs.

[52] U.S. Cl. 307/299, 179/15, 332/40, 325/105
[51] Int. Cl. H03k 19/08
[50] Field of Search 317/234/10; 331/107 G; 307/299; 332/40; 179/15 R; 325/105

[56] References Cited

UNITED STATES PATENTS

| | | | |
|---|---|---|---|
| 3,365,583 | 1/1968 | Gunn | 317/234 |
| 3,452,222 | 6/1969 | Shoii | 317/235 |

OTHER REFERENCES

IEEE TRANSACTIONS ON ELECTRON DEVICES, " Theory Of Negative-Conductance Amplification And Of Gunn Instabilities In ' Two Valley' Semiconductors" by McCumber et al., Vol. Ed. 13 No. 1, Jan. 1966, pages 4, 19, 20 and 21.

*Primary Examiner*—Jerry D. Craig
*Attorneys*—C. Cornell Remsen, Jr., Rayson P. Morris, Perry P. Laltzy, Philip M. Bolton and Isidore Togut

ABSTRACT: A communication system designed with semiconductive circuit arrangements using "Gunn Effect" devices exhibiting high field instability effects when an applied electrical field exceeds certain critical values. The transmitter has a plurality of "Gunn Effect" devices being connected to a separate input channel. Input signals are time division multiplexed and transmitted to a receiver having one "Gunn Effect" device with provision to separate the signals into their individual channels.

Inventors
CARL P. SANDBANK
DAVID L. THOMAS
By [signature]
Attorney

Inventors
CARL P. SANDBANK
DAVID L. THOMAS
By [signature]
Attorney

COMMUNICATION SYSTEM INCLUDING A PLURALITY OF SEMICONDUCTIVE CIRCUIT ARRANGEMENTS USING GUNN EFFECT DEVICES

CROSS-REFERENCES TO RELATED APPLICATIONS

This invention is related to the application of C. P. Sandbank–28, Ser. No. 583,036, filed Sept. 29, 1966 and entitled "Pulse Generators," now abandoned.

BACKGROUND OF THE INVENTION

This invention relates to semiconductor devices including semiconductor material exhibiting moving high field instability effects, and to apparatus embodying such devices.

If a crystal of certain semiconductive materials is subjected to a steady electrical field exceeding a critical value the resultant current flowing through the crystal contains an oscillatory component of frequency determined by the transit of a space charge distribution between the crystal contact areas. There are several examples of this phenomenon, three of these are given below:

*a*. It was first reported by J. B. Gunn for III—V semiconductors, (Solid State Communications Volume 1, page 88, 1963) and for these materials the phenomenon is due to electron transfer from a high to a low mobility state;

*b*. In piezolectric semiconductors, for example, Cadmium Sulfide, the high electric field domains are formed by acoustic amplification processes in semiconducting material which produce sharp current saturation effects and the trapping of electrons in a travelling domain of high acoustic amplitude;

*c*. In high resistivity (typically $10^6$ to $10^8$ ohms cm.) semiconducting materials, the phenomenon gives rise to high electric field domains which contain trapping centers whose trapping cross section is electric-field dependent. This phenomenon has been reported for gallium arsenide by D. D. Northrop, P. R. Thornton and K. E. Trezire (Solid State Electronics, Volume 7, page 17, 1964) and by M. Andre Barraud (Comptes Rendus, Volume 256, page 3632, 1963) and for gold doped germanium by B. K. Ridley and Pratt (Physics Letters, Volume 4, page 300, 1963 and Journal of Physical Chemistry of Solids, Volume 26, page 21, 1965). The high electric field domains propagate by a process in which electrons are lifted out of traps, carried a short distance in the applied field and then trapped again.

The frequency of oscillation is determined primarily by the length of the current path through the crystal. The phenomenon has been detected, as previously stated, in III—V semiconductors such as gallium arsenide and indium phosphide having N-type conductivity and also piezoelectric semiconductors.

The term "semiconductive material exhibiting high field instability effects" is used herein to include any material exhibiting the effect as defined in the preceding paragraphs, or exhibiting similar domain-transit phenomena which may be based on somewhat different internal mechanisms.

The value of the applied field below which spontaneous self-oscillation does not occur will be termed the threshold value. If the value of the steady electrical field at some point within the body is caused by the action of an input signal to exceed the threshold value for a time (less than 1 nanosecond for a Gunn Effect domain, less than 1 microsecond for an acoustic effect domain and less than $10^{13}$ to $10^{14}$ secs. for a trapping effect domain) shorter than the instability transit time between the two contact areas between which the field is applied, the current passed through the body by the external source of potential difference will undergo a single excursion from its steady state value to provide an output pulse giving power gain.

In order to obtain the form of single pulse operation defined in the preceding paragraph the steady state value of the applied field must exceed a lower threshold value, determined by experiment for a given material and typically between 50 percent and 75 percent of the threshold value. The steady-state field may be continuously applied or may be pulsed to reduce the total power dissipation in the device.

SUMMARY OF THE INVENTION

The invention provides a semiconductive circuit arrangement comprising a body of semiconductive material exhibiting high field instability effects, means for applying between spaced contact areas on said body a potential difference producing within said body a steady electrical field, an input signal circuit which modifies the said electrical field in response to an input signal, and at least one other contact area mounted on a surface of said body of semiconductive material, wherein the voltage across the high field domain which is formed in and which is caused to propagate along said body when said electrical field is in excess of the instability threshold value for said semiconductive material is modulated by said input signal, and wherein said other contact area provides the means for detecting the high field domain and thereby the modulated voltage across same when said high field domain propagates along said body.

According to a feature of the invention there is provided a communication system which utilizes semiconductive circuit arrangements as outlined in the preceding paragraph, wherein a plurality of said semiconductive circuit arrangements, each one of which is provided with at least one other contact area and connected via said input signal circuit to a separate input channel, form the transmitter of said communication system, wherein the outputs of said plurality of semiconductive circuit arrangements as detected by said other contact areas are associated with a single transmitter output circuit, and wherein the receiver of said communication system is formed by one of said semiconductive circuit arrangements having thereon other contact areas for each one of said plurality of semiconductive circuit arrangements.

The body of semiconductive material preferably consists of N-type gallium arsenide or indium phosphide; other III—V type semiconductors and piezoelectric semiconductors may also be employed.

BRIEF DESCRIPTION OF THE DRAWINGS

The foregoing and other features according to the invention will be understood from the following description with references to the accompanying drawings in which.

DESCRIPTION OF THE PREFERRED EMBODIMENTS

Figure 1:
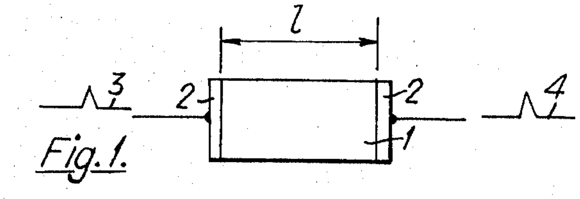
FIG. 1 shows diagrammatically a pulse generator in which the domain voltage is sensed at the anode.

Referring to FIG. 1, the active semiconductor element, for example, of N-type gallium arsenide (GaAs), germanium (Ge) or piezoelectric semiconductor, for example, cadmium sulfide consists of a parallel-sided disc 1 having ohmic contact areas 2 secured to its plain faces. A unidirectional current source is used to apply a potential difference of controllable value between the contact areas 2, and the output circuit would be arranged to extract any oscillatory component of the current flowing in the crystal.

The phenomenon referred to in preceding paragraphs manifests itself by the appearance in the output circuit (not shown in the drawing) of an oscillatory component in the current through the crystal 1 when the potential difference applied across the crystal from the unidirectional current source exceeds a critical value; for a crystal of gallium arsenide of length $2\times10^{12}$ cm. the critical potential necessary to cause oscillation is of the order of 60 volts, corresponding to a field within the crystal of the order of 3,000 volts per centimeter, the self-oscillatory frequency being directly related to the length (typically 1 to 2.5 mm. for GaAs, 1 mm. for Ge and 1 cm. for Cd. S.) of the crystal and being of the order of $10^9$ cycles per second.

The velocity of the various high field domain is $0.8\times10^7$ cms./sec. for the Gunn Effect domain, $10^{14}$ to $10^3$ cms./sec. for the trapping effect domain and $2\times10^5$ cms./sec. for the acoustic effect domain.

The potential difference applied between the contact areas 2 is a fraction determined by experiment of the potential necessary to cause self-oscillation and is chosen so that an oscillatory waveform or trigger pulse superimposed on it by external source carries the crystal 1 into its self-oscillatory condition for short intervals of time during each cycle of the input frequency; in other words the peak value of the oscillatory signal voltage is caused to be just sufficient to raise the electric field within the crystal above the threshold value. In these conditions it is found that each triggering of the crystal 1 by the peak of a trigger pulse 3 for example, causes a sharp current pulse 4, drawing power from the potential source, to appear in the output circuit. Thus an oscillatory waveform applied to the device will cause a corresponding train of sharp current pulses to appear at the output. The operation of the device is virtually independent of frequency provided that the self-oscillatory frequency is at no time exceeded. The power output available from the device depends on the dissipation permissible within the crystal 1. The output power may amount to several watts, but since the efficiency is relatively low this will involve a relatively high dissipation within the crystal. The driving potential may be pulsed to reduce the standing dissipation.

Figure 2:
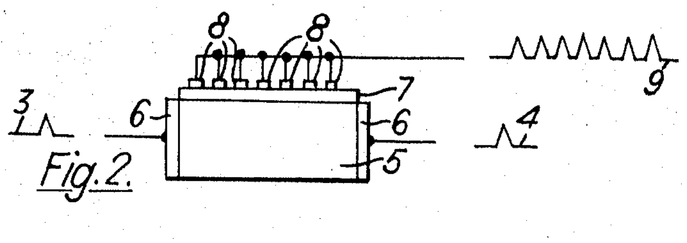
FIGS. 2 to 4 show diagrammatically alternative pulse generator arrangement in which the domain voltage is sensed by one or more electrodes along the device.
Figure 3:
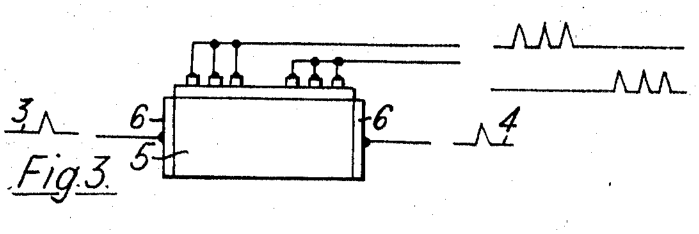
Figure 4:
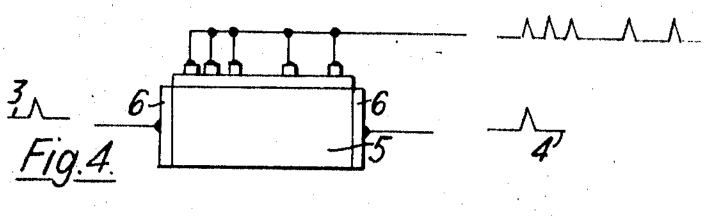

FIGS. 2 to 4 of the drawings show diagrammatically pulse generator arrangements in which the semiconductor device of FIG. 1 is modified to provide means to produce complex wave forms and phase differences at frequencies of the order of $10^9$ cycles per second. In these arrangements the semiconductor crystal 5, for example, GaAs, Ge or Cd.S. has contact areas 6 on its end faces across which the potential difference and the oscillatory input or the trigger pulse 3 is applied in the same way as in the arrangement shown in the drawing according to FIG. 1. However, the output circuit from the device is changed in these arrangements, a further series of contact areas 8 are deposited on one of the side faces of the semiconductor crystal 5 and electrically insulated from it by a thin layer of insulating material 7 such as silica. The multiple electrodes are thus situated near the high field instability region in the device and as the high field which manifests itself in the form of sharp current pulses in the output circuit, propagates along the device, due to the application of the trigger pulse 3 or each half-cycle of a sinusoidal input signal which is superimposed on the applied field so as to cause the threshold value to exceed the critical value of the device, it is sensed by each of the contact areas 8 in turn and capacitively coupled to the output to produce a series of output pulses 9 shown in the drawing according to FIG. 2. By suitable arrangement of the contact areas 8 the output from the device could be coupled or sent into separate circuits with suitable delay as shown by the waveforms 10 and 11 in the drawing according to FIG. 3, or a variety of codes could be built into the pulse train as shown in the drawing according to FIG. 4.

The arrangements detailed above could be operated by applying between the electrodes 6 a potential difference greater than the threshold value thereby causing self-oscillation. In this mode of operation the devices would give a continuous series of output pulses without the need for further external triggering.

When any one of the pulse generator arrangements shown in the drawings is overdriven most of the voltage which is extra to that required to establish the high field domain i.e. the voltage which is in excess of the threshold value for the device, appears across the high field domain. If, for example, a 100 volts are needed to establish the high field domain within the device and a meanlevel of the order of 150 volts is applied across the device then of this, approximately 80 volts would appear across the high field domain. If now a modulation of ±10 volts are superimposed on the 150 volts the high field domain voltage would vary from 70 volts to 90 volts as the high field domain propagated along with the device and the output of the device as detected by the terminals 8 or across the device would also be modulated by the same or proportional amount. It should be noted that if the device is overdriven for example, to a value of three or four times the threshold value the high field domain would take up some of the extra voltage until a point is reached where impact ionization occurs. Impact ionization limits the spread of the high field region, thus the additional bias or external source of potential difference is taken up by the bulk of semiconductive material outside the high field domain and would lead to the formation of a further domain. Thus it can be seen that there is a limit to the amplitude of the modulating voltage.

It should be noted that the contact area 8 need not be electrically insulated from the semiconductor crystal 5, a direct ohmic contact could be made to the crystal 5 provided the resistance of the output circuit which is to be coupled to the contact areas 8 is high enough not to interfere with the high field domain.

It should also be noted that the modulated voltage across the high field domain could be sensed as the high field domain propagates along the device by a pair of contact areas 8 which are situated in close proximity to each other and which are of a width which is comparable with the width of the high field domain. In this arrangement it is the voltage difference between the pair of contact areas that would be measured since a particular modulation condition would be arranged to occur at a point along the length of the device which coincided with the space between the pair of contact areas. This arrangement therefore enables the actual point along the length of the device where a particular modulation condition occurs to be more accurately positioned. One of this pair of contact areas may be earthed or alternatively the system could consist of a series of single contact areas closely surrounded by an earth plane.

Figure 5:
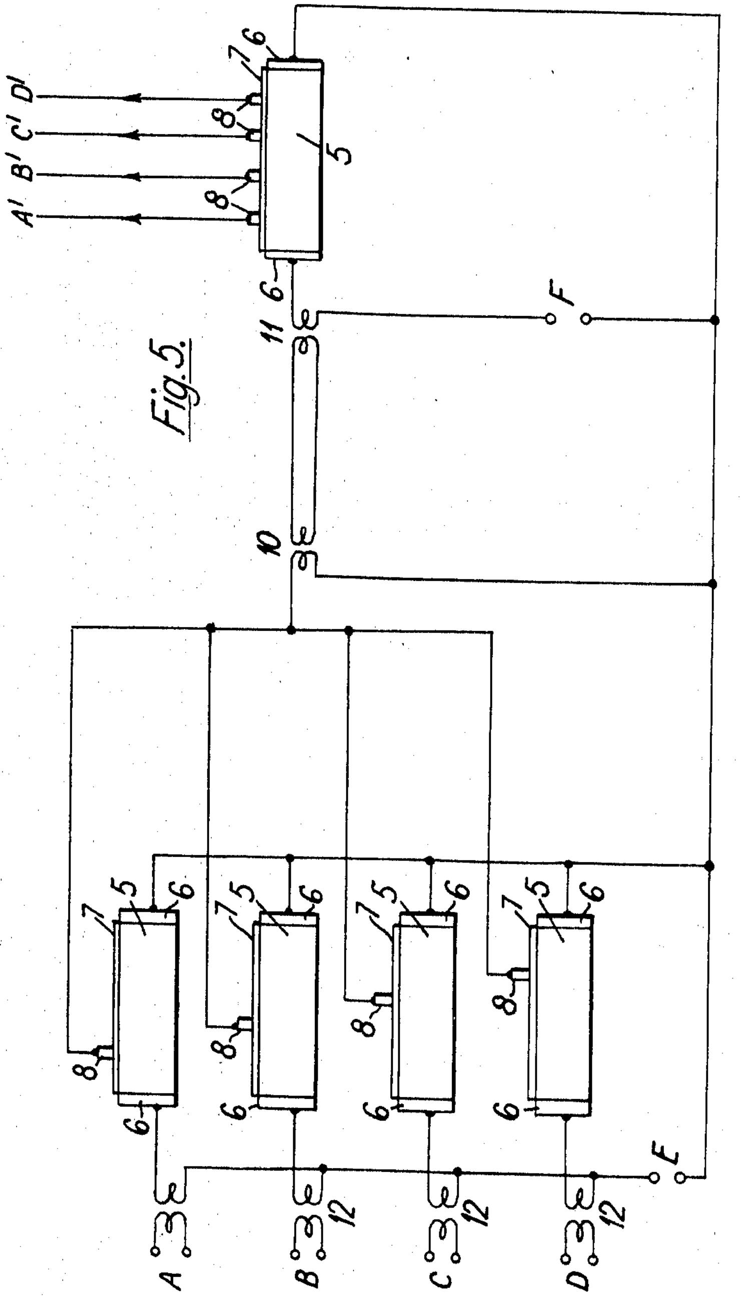
FIG. 5 shows diagrammatically a communication system which utilizes a plurality of the pulse generator arrangements shown in the drawings according to FIGS. 2 to 4.

The ability to modulate the voltage across the high field domain and thereby the output of the device may be employed in several applications, for example, in the communication system shown diagrammatically in the drawing according to FIG. 5.

In this system pulse generator arrangements similar to the ones shown in the drawings according to FIGS. 2 to 4 are utilized for the systems transmitter and receiver. The system illustrated is a four channel system but by applying the same principles there is no limit to the number of channels apart from the limitations imposed by the pulse generating arrangements, namely, the length of the semiconductor crystal 5.

The input signals A, B, C and D which may be analogue or digital signals are each applied via an input circuit 12 to separate pulse generating arrangements i.e. the systems' transmitters which have a unidirectional current source E of controllable value applied between the contact areas 6. Whilst a common unidirectional current source E is used it should be noted that individual current sources could be used if the individual current sources were synchronized such that the high field domains are initiated within the semiconductor crystals 5 at substantially the same instant in time. The input signals which are superimposed on the voltage applied at E modulate the voltage across the high field domains and this modulation which is therefore representative of the input signal is detected by the electrode 8 and extracted from the device by an output circuit 10.

The electrode 8 of each of the four input pulse generator arrangements is situated at a different point relative to the other electrodes 8 on the semiconductor crystals 5 therefore the output signals which is voltage modulated by the input signals A, B, C and D are detected and extracted by circuit 10 at different times thus the signal passed to the output pulse generator arrangement i.e. the systems' receiver via an input circuit 11 is a series of four current pulses which are displaced in time by an amount which is proportional to the displacement of the electrodes 8 along the semiconductor crystals 5.

A unidirectional current source F is used to apply a potential difference of controllable value between the contact areas 6 of the output pulse generator arrangement and the systems' transmitted output is superimposed on the voltage applied at F by way of the input circuit 11.

The receiver device is provided with four electrodes 8 displaced relative to each other along the semiconductor crystal 5 by an amount which is equivalent to the relative displacements of the electrodes 8 on the semiconductive crystals 5 of the transmitter devices and which is thereby proportional to the displacement of the four current pulses which form the transmitted signal applied at the input circuit 11.

The voltage across the high field domain formed in the receiver device by the voltage applied at F is therefore modulated by each of the pulses which form the transmitted signal and the effects of the modulation is detected by the electrodes 8 as the high field domain propagates along the receiver device and capacitively coupled to the output circuits A', B', C' and D'. To illustrate these effects more fully, the current pulse corresponding to the transmitter device connected to the input pulse A modulates the high field domain within the receiver device and the effects of this modulation is detected by the electrode 8 which is connected to the output circuit A' as the high field domain propagates along the device. During the transmit of the high field domain *b* between the electrodes 8 which are connected to the output circuits A' and B', the effects of the modulation by the current pulse associated with the input A will subside and the voltage across the high field domain will then be modulated by the current pulse corresponding to the transmitter device connected to the input pulse B. The effects of this modulation will be detected by the electrode 8 which is connected to the output circuit B' as the high field domain propagates along the device. Similar mechanisms are involved with the modulation of the voltage across the high field domain by the transmitted current pulses associated with the transmitter devices connected to the input signals C and D.

For efficient operation of the communication system it is necessary to apply some form of synchronization between the unidirectional current sources E and F, the input signals A, B, C and D and the output circuits A', B', C' and D'.

It should be noted that in the communication system outlined above each of the individual contact areas 8 could be replaced by a pair of contact areas which are situated in close proximity to each other and which are each of a width comparable with the width of the high field domain and it should also be noted that the contact areas 8 need not necessarily be electrically insulated from the crystal 5 they could as previously stated be in ohmic contact with the crystal 5.

It can be therefore seen from the above that provided the whole communication system is synchronous, signals from a number of separate channels, for example, channels of a TDM (Time Division Multiplex) system may be transmitted as a composite signal over a single communications link and then separated again into the individual channels at the receiver of the system.

While I have described the above principles of my invention in connection with specific embodiments, it is to be clearly understood that this description is made only by way of example and not as a limitation to the scope of my invention as set forth in the accompanying claims.

We claim:

1. A communication system comprising:

a transmitter including a plurality of semiconductive circuit arrangements;

a receiver including a single semiconductive circuit arrangement;

each of said plurality of circuit arrangements comprising:

a body of semiconductive material exhibiting high field instability effects;

means for applying between spaced contact areas on said body a potential difference producing within said body a steady electric field;

means including an input signal applied between said spaced contact areas for causing said electric field to be in excess of the instability threshold value for said semiconductive material to create a high field domain within and to propagate along said body; and at least one other contact area mounted on the surface of said body in the direction of propagation of said field so as to detect said propagating high field domain;

each of said plurality of semiconductive circuit arrangements forming one channel of said transmitter, and each of said one other contact area being disposed on said body surface at different distances from the source of said propagating high field domain so as to provide for time division multiplexing outputs; and said single semiconductive circuit arrangement comprising:

another body of semiconductive material exhibiting high field instability effects;

means for applying between spaced contact areas on said other body a potential difference producing within said other body another steady electrical field;

means for applying the outputs of said plurality of circuit arrangements across said spaced contact areas of said other body for causing the propagation of another high field domain with and along said body when said electric field is in excess of the instability threshold value for the semiconductive material of said other body; and a plurality of contact areas equal in number to said plurality of circuit arrangements disposed along the length of said other body at a distance equivalent to the relative displacements from the source of said propagating high field domains of each of said one contacts on each body of said plurality of circuit arrangements, said plurality of contacts constitute the output terminals of said receiver.

2. A communication system according to claim 1 wherein a pair of said other contact areas provides the means for detecting the modulated voltage across said high field domain at any point along the length of said body, the width of each one of said pair of other contact areas being comparable with the width of said high field domain.

3. A communication system according to claim 1 wherein said other contact area is insulated from said surface of said body.

4. A communication system according to claim 3 wherein said insulating material is silica.

5. A communication system according to claim 1 wherein said body of semiconductive material is provided by a Group III—V semiconductor having N-type conductivity, high resistivity ($10^6$ to $10^8$ ohms cm.) semiconductive material.

6. A communication system according to claim 1 wherein said body of semiconductive material is provided by a piezoelectric semiconductive material.

7. A communication system as claimed in claim 5 wherein said Group III—V semiconductor having N-type conductivity is gallium arsenide or indium phosphide.

8. A communication system as claimed in claim 5 wherein said high resistivity semiconductive material is either germanium or gallium arsenide.

9. A communication system as claimed in claim 6 wherein said piezoelectric semiconductive material is cadmium sulfide.